United States Patent
Le Peltier et al.

(10) Patent No.: US 6,315,892 B1
(45) Date of Patent: Nov. 13, 2001

(54) CATALYTIC HYDROREFORMING PROCESS

(75) Inventors: Fabienne Le Peltier; Blaise Didillon; Patrick Sarrazin, all of Rueil Malmaison; Jean-Paul Boitiaux, Poissy, all of (FR)

(73) Assignee: Institut Francais du Petrole (FR)

( * ) Notice: Subject to any disclaimer, the term of this patent is extended or adjusted under 35 U.S.C. 154(b) by 0 days.

(21) Appl. No.: 09/688,167

(22) Filed: Oct. 16, 2000

Related U.S. Application Data

(63) Continuation of application No. 08/238,856, filed on May 6, 1994, now abandoned.

(30) Foreign Application Priority Data

May 6, 1993 (FR) .................................................. 93 05553

(51) Int. Cl.⁷ ......................... C10G 35/085; C10G 35/09
(52) U.S. Cl. ......................... 208/139; 208/138; 208/134; 502/506; 502/514; 502/513
(58) Field of Search .................................... 208/134, 138, 208/139, 140; 502/506, 513, 514, 334

(56) References Cited

U.S. PATENT DOCUMENTS

| | | |
|---|---|---|
| 3,531,543 | 9/1970 | Clippinger et al. ............... 260/683.3 |
| 3,909,451 | 9/1975 | Wilhelm . |
| 3,998,900 | 12/1976 | Wilhelm . |
| 4,329,258 | 5/1982 | Engelhard et al. . |
| 4,504,593 | 3/1985 | Trinh Dinh et al. . |
| 4,506,032 | 3/1985 | Imai et al. . |
| 4,507,401 | 3/1985 | Dubois et al. ....................... 502/242 |
| 4,513,098 | 4/1985 | Tsao . |
| 4,548,918 | * 10/1985 | Bournonville et al. ............... 502/154 |
| 4,560,468 | 12/1985 | Kukes et al. . |
| 4,578,180 | 3/1986 | Kukes et al. . |
| 4,595,673 | 6/1986 | Imai et al. . |
| 4,608,360 | 8/1986 | Abrevaya et al. . |
| 4,677,237 | 6/1987 | Imai et al. . |
| 4,716,142 | 12/1987 | Laine et al. . |
| 4,716,143 | 12/1987 | Imai et al. ........................... 502/326 |
| 4,737,262 | 4/1988 | Franck et al. ........................... 208/65 |
| 4,880,764 | 11/1989 | Imai et al. . |
| 4,888,104 | 12/1989 | Ramirez de Aqudelo et al. . |
| 5,128,300 | 7/1992 | Chao et al. . |
| 5,215,950 | 6/1993 | Bournonville et al. ................ 502/66 |
| 5,227,557 | 7/1993 | Bournonville et al. .............. 585/419 |
| 5,268,522 | 12/1993 | Bournonville et al. .............. 585/415 |

FOREIGN PATENT DOCUMENTS

| | | |
|---|---|---|
| 2210443 | 7/1974 | (FR) . |
| 2539647 | 7/1984 | (FR) . |
| 2545380 | 11/1984 | (FR) . |
| 2594711 | 8/1987 | (FR) . |

* cited by examiner

*Primary Examiner*—Walter D. Griffin
(74) *Attorney, Agent, or Firm*—Millen, White, Zelano & Branigan, P.C.

(57) ABSTRACT

A process of hydroreforming in the presence of a catalyst containing at least one refractory inorganic carrier, platinum, possibly at least one metal from Group VIII (palladium, nickel, and ruthenium), a halogen or compound thereof, and at least one additional metal M selected from among germanium, tin, lead, gallium, indium, and thallium, process in which said metal M, in the form of at least one organic compound, is introduced in situ into the reactor where the hydrocarbon charge will then be treated or into a prereactor that is connected to said reactor.

24 Claims, No Drawings

CATALYTIC HYDROREFORMING PROCESS

This is a continuation, of application Ser. No. 08/238,856 filed May 6, 1994, now abandoned.

CROSS-REFERENCE TO RELATED APPLICATION

This application is related to commonly assigned application Ser. No. 08/238,856 filed May 6, 1994, entitled "PROCESS OF CATALYTIC HYDROGENATION," by Fabienne Le Peltier et al., the disclosure of which is hereby incorporated by reference.

BACKGROUND OF THE INVENTION

This invention pertains to a process for converting hydrocarbons by hydroreforming, in the presence of a catalyst that contains a carrier, at least one metal from the platinum family (since the presence of platinum is necessary, it can be combined with another element from Group VIII in the periodic table), at least one additional metal (referred to as metal M) selected from among germanium, tin, lead, gallium, indium, and thallium, and a halogen (or a halogen compound).

There are many patents and publications showing that adding catalyst promoters to a base metal improves the quality of the catalysts. These elements are added in different forms such as salts or organometallic compounds. This generally produces more active or more selective catalysts, sometimes more stable than with the base metal. The way in which these modifiers are added is significant since it greatly influences the properties of the catalysts.

Acidic catalysts containing, in addition to a carrier, a noble metal from the platinum family and at least one additional metal selected from among the group consisting of tin, germanium, and lead, (FR-A-2031984), gallium, indium, and/or thallium (U.S. Pat. No. 2,814,599) have long been known.

SUMMARY OF THE INVENTION

This invention provides a modification of a catalyst, hereinafter referred to as a "precatalyst", by adding, under well controlled conditions, modifier elements directly into the reactor or prereactor where the use of the catalyst must be made. This approach has a number of practical advantages, but, surprisingly enough, it has been found that this means of production makes it possible to obtain considerably better-performing catalysts than those obtained by off-site preparation.

The process of catalytic hydroreforming as well as the catalytic process of producing aromatic hydrocarbons according to the invention are carried out at, for example, a temperature between 400° C. and 600° C. at an absolute pressure of between 0.1 and 3.5 MPa, and at an hourly rate of between 0.1 and 10 volumes of liquid charge per volume of catalyst, with the ratio of hydrogen to hydrocarbons being between 1 and 20. The catalysts that are prepared according to the invention make it possible especially to implement these two processes under harsh conditions. Thus, the use of these catalysts is applied, in particular, to reforming reactions to obtain a gasoline with a clear octane number equal to or greater than 102. More specifically, the severe conditions of the hydroreforming or catalytic hydroreforming reactions are as follows: a mean temperature of between approximately 480° C. and 580° C., a pressure of between 0.2 and 1.8 MPa, and preferably between 0.3 and 3 MPa, an hourly rate of between 1 and 10 volumes of liquid charge per volume of catalyst, and a recycling rate of between 1 and 6 mols of hydrogen per mol of charge. If the charge is unsaturated, i.e., if it contains monoolefins or polyolefins, it must first be stripped of them through complete hydrogenation. The charge is generally a direct-distillation naphtha, a pyrolysis gasoline, or a cracked gasoline, especially a vapor-reformed gasoline.

The carrier of the catalyst according to the invention comprises at least one refractory oxide which is generally selected from among the oxides of the metals of Groups II, III, or IV of the periodic system, such as for example the oxides of magnesium, aluminum, silicon, titanium, zirconium, or thorium, either by themselves or mixed together or mixed with other oxides of elements of the periodic system. It is also possible to use carbon. It is additionally possible to use zeolites or molecular sieves of the types X, Y, mordenite, faujasite, ZSM-5, ZSM-4, ZSM-8, etc., as well as mixtures of metallic oxides of groups II, III, and/or IV with zeolitic material.

For reactions involving reforming or the production of aromatic hydrocarbons, the preferred carrier is aluminum oxide, whose specific surface area is advantageously between 50 and 400 $m^2$ per gram, and preferably between 100 and 400 $m^2$ per gram.

The precatalyst is prepared from a preformed carrier according to standard methods that consist in impregnating the carrier with solutions of compounds of the elements that are desired to be introduced. Either a common solution of the metals that are present in the precatalyst or different solutions in some order are used. When several solutions are used, intermediate drying and/or calcination steps are carried out.

For example, the introduction of platinum (and possibly other metals from Group VIII and, for example, the elements of the platinum family) can be performed by impregnating the carrier with an aqueous solution of a halogen compound. Platinum is preferably introduced in the form of chloroplatinic acid.

After the introduction of the Group VIII metal, the product obtained is calcined, after an optional drying; calcination is preferably carried out at a temperature of between 400 and 700° C. and optionally in the presence of a halogenated organic compound. The halogenated organic compounds are selected, for example, from the group consisting of carbon tetrachloride, chloroform, dichloromethane, and dichloropropane, as described in FR-A-2,594,711.

In that same patent, the introduction of the additional metal(s) M is also described. Thus, after halogen is introduced, the additional metal(s) is (are) introduced into the precatalyst. Optionally before said metal M is introduced, reduction with hydrogen is carried out at a high temperature, for example, between 300 and 500° C. This reduction can consist of, for example, a slow rise in temperature under a stream of hydrogen up to a desired temperature of between 300 and 500° C., and preferably between 350 and 450° C., followed by a holding at this temperature under hydrogen for 1–6 hours.

The additional metal M is introduced in the form of at least one organometallic or alcoholate compound selected from the group consisting of complexes, especially the carbonylic and polyketonic complexes of metals M, and the hydrocarbyl metals of metal M such as alkyls, cycloalkyls, aryls, metal alkylaryls, and metal arylalkyls.

It is advantageous to introduce metal M by means of a solution in an organic solvent of the alcoholate or organometallic compound of said metal M. It is also possible to use organo-halogenated compounds of metals M. Compounds of metals M that can be mentioned include but are not limited to, in particular, tetrabutyl tin, tetramethyl tin, tetrapropyl germanium, diphenyl tin, tetraethyl lead, indium acetylacetonate, thallium acetylacetonate, thallium ethanolate, triethyl gallium, and a rhenium carbonyl.

The impregnation solvent is preferably from the group consisting of oxygenated organic solvents containing 2–8 carbon atoms per molecule and the paraffinic, naphthenic, or aromatic hydrocarbons containing essentially 6–15 carbon atoms per molecule and halogenated organic compounds containing 1–15 carbon atoms per molecule. Specific examples include but are not limited to ethanol, tetrahydrofuran, n-heptane, methyl cyclohexane, toluene, and chloroform. These solvents can be used by themselves or mixed together, as well as in the way described in the patent U.S. Pat. No. 4,548,918.

It has now been discovered that introducing additional metal M in situ produces unexpected results. A preferred method of introduction is characterized by said additional metal M being introduced by bringing at least one organic compound of the additional metal M (in pure form or optionally diluted with at least one hydrocarbon solvent) into contact under an inert atmosphere (for example, nitrogen) with the precatalyst that has been loaded into the reactor where the reaction charge(s) will be injected, i.e., the reactor where the hydrocarbons will undergo the hydroreforming transformation in the presence of the thus-prepared catalyst, or with the precatalyst that is loaded into a prereactor which is connected directly to said reactor. In this invention the precatalyst is a catalyst that contains at least one carrier, at least one metal of Group VIII of the periodic system of elements, optionally a halogen or a halogenated compound. This precatalyst does not contain said additional metal M.

The addition of the additional metal M is accomplished in situ in liquid or gaseous phase, i.e., in the industrial reactor (reaction zone) or in an industrial pre-reactor (reaction prezone) that is connected directly to said reactor and where the precatalyst, the precursor of the finished catalyst, is charged. This operation of fixing the additional metal M can be carried out at between 20 and 500° C.

The preparation of the precatalyst, the precursor of the finished catalyst, is done according to any technique known to one skilled in the art.

To introduce the metal M into the precatalyst, the precatalyst is first charged into the industrial reactor or the industrial pre-reactor. Before this charging is done, the precatalyst may be dried and subjected to calcination under an oxidizing atmosphere at between 450 and 600° C. According to the invention, the precatalyst is then subjected to an activation treatment under a reducing atmosphere (hydrogen) or an inert atmosphere (nitrogen). The preferred solution is an activation treatment under hydrogen at high temperature, for example, between 300 and 600° C. This reduction can consist of, for example, a slow rise in temperature under a stream of hydrogen up to the maximum reduction temperature, for example between 300 and 600° C., followed by a holding at this temperature under hydrogen for 1–6 hours.

After the temperature has been adjusted to the desired value, between 20 and 500° C., preferably under a stream of hydrogen, metal M is then introduced. Before being brought into contact with the charge to be treated, the impregnation solvent is eliminated if necessary, and a heat treatment is carried out under a stream of gas, preferably hydrogen at a high temperature, between 300 and 600° C., for several hours.

The preferred composition of the catalyst contains, by weight of the carrier, (a) approximately 0.01% to 2% and preferably 0.1 to 0.5% of at least one noble metal from the platinum family, including 0.01% to 2% and preferably 0.01% to 1% platinum, (b) approximately 0.005 to 0.5%, advantageously 0.005 to 0.3% and preferably 0.01 to 0.2% tin or 0.0058 to 0.3% and preferably approximately 0.01 to 0.25% of at least one metal selected from the group consisting of germanium, lead, indium, gallium, rhenium, tungsten, and thallium, and (c) approximately 0.1% to 15% by weight and preferably 0.9 to 2.8% of a halogen such as chlorine and fluorine. The overall amount of metals M of the catalysts containing tin and another metal M are approximately 0.01% to 0.48% and preferably 0.02 to 0.3%.

A preferred method of preparing catalysts according to the invention is comprised of the following steps:

(a) a carrier is impregnated with an aqueous solution containing at least one metal from Group VIII. A catalytic mass that was previously referred to as a "precatalyst" is obtained;

(b) the catalytic mass (or precatalyst) that is obtained is dried;

(c) the catalytic mass that is obtained is calcined in the presence of a halogenated compound;

(d) the catalytic mass that is obtained is charged into an industrial reactor or an industrial pre-reactor;

(e) the calcined catalytic mass charged into the reactor is reduced;

(f) the charged catalytic mass reduced in the reactor is contacted with an organic compound of the additional metal M, either in the pure form or solubilized in a hydrocarbon compound;

(g) if necessary, the solvent is eliminated (when the solvent is a component of a charge, e.g., n-heptane or methylcyclohexane, it is unnecessary to eliminate the solvent);

(h) the catalytic mass containing the platinum or noble metal from the platinum family and the additional metal M is reduced.

It has thus been discovered that by working in the presence of catalysts that are prepared according to the invention, these catalysts had greater activity, a longer service life, and better regenerability compared with the catalysts of the prior art that are prepared according to the techniques of the prior art.

In the context of the present invention, the industrial reactor and prereactor are conventional. The prereactor is a reactor or an enclosure placed upstream of the reactor where the reforming reaction occurs. Prereactors are, for example, enclosures in which combustion and oxychlorination take place for catalyst regeneration. For further details, attention is invited to the literature.

It is also to be noted that a catalyst prepared outside the reactor or preactor (ex situ) and stored under an inert atmosphere before being charged and then charged under an inert atmosphere (to avoid oxidation) would yield the same result as a catalyst prepared in situ. However, it is necessary to conduct the charging of the reactor with the catalyst under an inert atmosphere after the reactor and associated conduits are flushed with an inert atmosphere. This operation takes a longer time than charging with precatalyst and preparation of the catalyst in situ; thus, reactor downtime is longer, resulting in a higher cost of production. Furthermore, for storing the catalyst under an inert atmosphere, special containers must be used, and every container must be checked before use, resulting in still further costs as compared to the present invention.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents, and publications cited herein and of corresponding French Application 93/05553, filed May 6, 1993, are hereby incorporated by reference.

EXAMPLES

Example 1

Three catalysts, A, B, and C, are prepared by different methods, but the resultant catalysts all contain 0.25% platinum by weight, 0.14% tin by weight, and 1.5% chlorine by weight. The carrier is an aluminum oxide with a specific surface area of 220 m$^2$ per gram and a pore volume of 0.60 cm$^3$ per gram.

Preparation of Catalyst A (Comparative)

A catalyst A is prepared according to the techniques of the prior art.

Five hundred cm$^3$ of an aqueous solution of hydrochloric acid is added to 100 g of an aluminum oxide carrier. They are left in contact for 3 hours, and the solids are separated from the supernatant liquid, e.g., by centrifugation or filtration. After drying, impregnation of the resultant dried chlorine-containing product with platinum and tin is accomplished by adding to the solid 60 cm$^3$ of a solution of hexachloroplatinic acid and stannic chloride. The platinum concentration of this solution is equal to 4.2 g per liter, and the tin concentration is 2.33 g per liter. They are left in contact for 6 hours, dried at 120° C. for 1 hour, and then calcined for 2 hours at 530° C.

Preparation of Catalyst B (Comparative)

A catalyst B is prepared from 100 g of an aluminum oxide carrier to which is added 60 cm$^3$ of an aqueous solution of hydrochloric acid and of hexachloroplatinic acid containing a total of 0.25 g of platinum and 1.5 g of chlorine. After contact for 4 hours, the resultant material is dried at 120° C. for 1 hour, and then calcined for 2 hours at 530° C. The catalyst is then reduced for 2 hours under a stream of hydrogen of 80 liters per hour at 450° C.

Then, on 50 g of the reduced platinum-containing product (previously referred to as the precatalyst), tin impregnation is carried out in a reaction flask by adding 30 cm$^3$ of an n-heptane solution containing 0.21 g of tetrabutyl tin. This solution is left in contact with the precatalyst at ambient temperature for 8 hours under a stream of hydrogen of 85 liters per hour. The resultant solid is separated, e.g., by centrifugation or filtration, and then dried at 120° C. and thereafter calcined at 530° C. for 2 hours.

Preparation of Catalyst C (According to the Invention)

Ten g of calcined precatalyst with platinum is prepared under the same conditions as described for catalyst B. The precatalyst is then charged into an isothermal tube reactor operating under downward flow at atmospheric pressure.

The precatalyst is then reduced for 2 hours in the reactor under 20 liters per hour of hydrogen at 530° C. The temperature is then reduced to ambient temperature while keeping the stream of hydrogen flowing. A solution of n-heptane containing 0.05 g of tetrabutyl tin is then circulated. The circulation of the solvent is maintained for 8 hours at ambient temperature, still under a stream of hydrogen. The solvent is then eliminated, and the catalyst is reduced under a stream of hydrogen of 20 liters per hour for 2 hours at 530° C. This catalyst, referred to as catalyst C, can be used directly for the contemplated catalytic reaction envisioned.

Example 2

Catalysts A, B, and C are subjected to a catalytic reforming test.

The composition of the treated charge is as follows:

| | |
|---|---|
| n-hexane | 50% |
| i-hexanes (2 methyl pentane and 3 methyl pentane in equivalent quantities) | 40% |
| methylcyclopentane | 8% |
| cyclohexane | 2%. |

The tests are carried out under the following operating conditions:

| | |
|---|---|
| temperature | 470° C. or 510° C. |
| pressure | 1 Mpa |
| hydrogen/hydrocarbons | 3 |
| hourly volume of charge per volume of catalyst | 3 |

The results obtained under these conditions (total conversion, benzene yield, and hydrogen yield) are summarized in Table 1. The yields are expressed as % by weight with respect to the charge.

TABLE 1

| Catalyst | Temperature (° C.) | Conversion (wt. %) | Benzene yield (wt. %) | H$_2$ yield (wt. %) |
|---|---|---|---|---|
| A | 470 | 30 | 9 | 0.15 |
|   | 510 | 61 | 15 | 0.06 |
| B | 470 | 35 | 11 | 0.18 |
|   | 510 | 63 | 16 | 0.09 |
| C | 470 | 38 | 13 | 0.2 |
|   | 510 | 66 | 17 | 0.2 |

Catalyst C, prepared according to the invention, obtains better catalytic results than catalyst A, which is prepared according to the techniques of the prior art. In addition, the properties of catalyst C are superior to those of catalyst B, even though these two catalysts were prepared from the same tin precursor with catalyst C having been prepared directly in the tube reactor used in the tests of the catalytic activity of the catalysts.

Example 3

A C$_6$-cut having the same composition given in Example 1 is treated under operating conditions that are identical to those specified in Example 2, using catalysts containing germanium (0.08% by weight) or lead (0.21% by weight) as an additional metal.

Catalysts D and E (comparative examples) were prepared in the same way as catalyst A, except that stannic chloride was replaced by germanium tetrachloride (catalyst D) and lead nitrate (catalyst E). In the case of the germanium tetrachloride, it was dissolved in ethanol before being used.

Catalysts F and G (comparative examples) were prepared like catalyst B, except that tetrabutyl tin was replaced with tetrabutyl germanium (catalyst F) or tetraethyl lead (catalyst G).

Catalysts H and I (of the invention) were prepared like catalyst C, except that tetrabutyl tin was replaced by tetrabutyl germanium (catalyst H) or tetraethyl lead (catalyst I).

Table 2 compares the properties of catalysts D through J. The yields are expressed as percent by weight with respect to the charge.

Catalysts H and I, which were prepared according to the invention, exhibit better catalytic performances than catalysts D and E, which were prepared according to the techniques of the prior art. Moreover, the catalytic performances of these catalysts are superior to that of catalysts F and G, although catalysts H and F or I and G were prepared from the same germanium or lead precursor while catalysts H and I were prepared directly in the tube reactor of the catalytic test.

TABLE 2

| Catalyst | Temperature (° C.) | Conversion (wt. %) | Benzene Yield (wt. %) | $H_2$ Yield (wt. %) |
| --- | --- | --- | --- | --- |
| D | 470 | 29 | 8 | 0.13 |
| (Ge 0.08%) | 510 | 59 | 13 | 0.05 |
| E | 470 | 28 | 8 | 0.13 |
| (Pb 0.21%) | 510 | 58 | 12 | 0.05 |
| F | 470 | 32 | 10 | 0.16 |
| (Ge 0.08%) | 510 | 61 | 15 | 0.08 |
| G | 470 | 32 | 10 | 0.17 |
| (Pb 0.21%) | 510 | 62 | 14 | 0.09 |
| H | 470 | 36 | 12 | 0.18 |
| (Ge 0.08%) | 510 | 64 | 16 | 0.17 |
| I | 470 | 37 | 12 | 0.19 |
| (Pb 0.21%) | 510 | 65 | 16 | 0.18 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. In a process for hydroreforming, comprising subjecting a hydrocarbon charge to hydroreforming conditions in the presence of a catalyst containing at least one carrier, platinum, at least one additional metal M which is tin, and halogen, the improvement comprising using a catalyst which is obtained by introducing at least one organic compound of said at least one additional metal M, into a calcined and activated catalytic mass, referred to as a precatalyst, which mass includes at least one carrier and platinum, with said additional metal M being introduced in pure or dilute form, in situ, into a reaction zone where the hydroreforming of the charge is to be done in the presence of said catalyst.

2. A process according to claim 1, wherein the catalyst is prepared according to a process comprising:

(a) in a first stage, preparing offsite a precatalyst, which contains at least said carrier and platinum, optionally subjecting the precatalyst to drying and optionally to calcining at this stage;

(b) introducing the precatalyst into a reaction zone where the charge will be sent to be treated by said catalyst;

(c) subjecting the precatalyst to an activation treatment in an inert or reducing atmosphere; and (d) in a second stage, introducing said additional metal M into the precatalyst by bringing at least one organic compound of said additional metal M into contact with the precatalyst under an inert or reducing atmosphere.

3. A process according to claim 2, in which subjecting the precatalyst to an activation treatment in an inert or reducing atmosphere is conducted at 20–250° C.

4. A process according to claim 2, in which subjecting the precatalyst to an activation treatment in an inert or reducing atmosphere is conducted at 20–75° C.

5. A process according to claim 2, in which subjecting the precatalyst to an activation treatment in an inert or reducing atmosphere is conducted at 20–60° C.

6. A process according to claim 1, wherein the precatalyst also contains a metal from Group VIII.

7. A process according to one of claim 1, wherein the precatalyst contains at least a halogen or a halogen compound.

8. A process according to claim 7, wherein the organic compound of the additional metal M is introduced in the liquid or gaseous phase.

9. A process according to claim 1, wherein the organic compound of the additional metal M is introduced onto the precatalyst in at least one impregnation solvent, which is a hydrocarbon solution.

10. A process according to claim 9, wherein upon the completion of preparation of the catalyst and before the charge to be treated is contacted with the catalyst, the impregnation solvent of the additional metal M is eliminated, and then heat treatment effective to activate said catalyst is carried out.

11. A process according to claim 10, wherein said heat treatment is carried out under a stream of hydrogen at a temperature of between 300 and 600° C.

12. A process according to claim 9, wherein said impregnation solvent of said metal M is an organic oxygenated solvent containing 2–8 carbon atoms per molecule, a paraffinic, naphthenic, or aromatic hydrocarbon containing 6–15 carbon atoms per molecule, or a halogenated organic compound containing 1–15 carbon atoms per molecule.

13. A process according to claim 12, wherein the impregnation solvent is selected from the group consisting of ethanol, tetrahydrofuran, n-heptane, methylcyclohexane, toluene, and chloroform.

14. A process according to claim 1, wherein the activation of the precatalyst is accomplished in a reducing atmosphere in the presence of hydrogen, between 300 and 600° C.

15. A process according to claim 1, wherein the additional metal M is introduced into the precatalyst in the form of at least one organometallic or alcoholate compound.

16. A process according to claim 15, wherein said organometallic or alcoholate compound is a carbonylic or polyketonic complex of metal M, or a hydrocarbyl compound of metal M.

17. A process according to claim 16, wherein the hydrocarbyl compound of metal M is an alkyl, cycloalkyl, aryl, alkylaryl or arylalkyl compound.

18. A process according to claim 1, wherein said organic compound of metal M is tetrabutyl tin or tetramethyl tin.

19. A process according to claim 1, wherein hydroreforming takes place at a temperature of between 400 and 600° C., at a pressure of between 0.1 and 3.5 MPa, and at an hourly rate of between 0.1 and 10 volumes of liquid charge per volume of catalyst, with the molar ratio of hydrogen to hydrocarbon being between 1 and 20.

20. A process according to claim 19, wherein the temperature is between 480° C. and 580° C., the pressure is between 0.2 and 1.8 MPa, the hourly rate is between 1 and 10 volumes of liquid charge per volume of catalyst, and the recycling rate is between 1 and 6 mols of hydrogen per mol of charge.

21. A process according to claim 19, wherein the pressure is set between 0.3 and 3 MPa.

22. A process according to claim 1, wherein the catalyst also contains at least one metal from Group VIII.

23. In a hydroreforming process, comprising subjecting in a reaction zone a hydrocarbon charge to hydroreforming conditions in the presence of a catalyst containing a carrier, platinum, an additional metal M, which is Sn, and a halogen, the improvement comprising using as the catalyst one prepared by a process in which the metal M is introduced into the catalyst in situ in the reaction zone.

24. In a hydroreforming process, comprising subjecting in a reaction zone a hydrocarbon charge to hydroreforming conditions in the presence of a catalyst containing a carrier, platinum, an additional metal M, which is Sn, and a halogen, the improvement comprising using as the catalyst one prepared by a process in which the metal M is introduced into the catalyst under a reducing atmosphere in situ in the reaction zone, and the catalyst is maintained under said atmosphere until commencement of hydroreforming.

* * * * *